US010488734B2

(12) United States Patent
Imai et al.

(10) Patent No.: US 10,488,734 B2
(45) Date of Patent: Nov. 26, 2019

(54) LENS UNIT, CAMERA, AND ELECTRONIC DEVICE

(71) Applicant: Nidec Copal Corporation, Tokyo (JP)

(72) Inventors: Kenzo Imai, Tokyo (JP); Nobuaki Watanabe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 15/753,675

(22) PCT Filed: Aug. 9, 2016

(86) PCT No.: PCT/JP2016/073447
§ 371 (c)(1),
(2) Date: Aug. 6, 2018

(87) PCT Pub. No.: WO2017/030048
PCT Pub. Date: Feb. 23, 2017

(65) Prior Publication Data
US 2018/0341166 A1 Nov. 29, 2018

(30) Foreign Application Priority Data
Aug. 20, 2015 (JP) .................. 2015-162985

(51) Int. Cl.
| | |
|---|---|
| G03B 9/02 | (2006.01) |
| G02B 7/08 | (2006.01) |
| G03B 11/00 | (2006.01) |
| G03B 9/10 | (2006.01) |
| H04N 5/225 | (2006.01) |
| G02B 13/00 | (2006.01) |
| G02B 5/00 | (2006.01) |
| G03B 9/12 | (2006.01) |

(Continued)

(52) U.S. Cl.
CPC .............. G03B 9/02 (2013.01); G02B 5/005 (2013.01); G02B 7/021 (2013.01); G02B 7/08 (2013.01);
(Continued)

(58) Field of Classification Search
None
See application file for complete search history.

(56) References Cited

U.S. PATENT DOCUMENTS 6,817,788 B1 * 11/2004 Negishi .................. G03B 11/00
348/342
2005/0226612 A1 * 10/2005 Haung ..................... G03B 9/06
396/508

(Continued)

FOREIGN PATENT DOCUMENTS

| JP | 1999-142906 A | 5/1999 |
|---|---|---|
| JP | 2004-309954 A | 11/2004 |

(Continued)

OTHER PUBLICATIONS

International Search Report dated Nov. 15, 2016 during the prosecution of PCT/JP2016/073447, English Translation.

*Primary Examiner* — William B Perkey
(74) *Attorney, Agent, or Firm* — Troutman Sanders LLP

(57) ABSTRACT

A lens unit comprises a lens barrel, a pair of base plates, and iris blade, and a blade driving portion. The lens barrel holds a plurality of lenses, and has a first slit that extends in the circumferential direction. A pair of base plates each has an opening portion, and are stacked to structure a blade chamber, with a portion thereof protruding from the first slit, and is positioned so that the opening portions thereof are between the lenses. The iris blade is disposed in the blade chamber. A blade driving portion is secured to a portion of the pair of base plates, and drives the iris blade to open and close the opening portions in the iris blade.

13 Claims, 12 Drawing Sheets

(51) Int. Cl.
*G02B 7/02* (2006.01)
*G03B 13/34* (2006.01)
*G02B 5/20* (2006.01)

(52) U.S. Cl.
CPC ............ *G02B 13/003* (2013.01); *G03B 9/10* (2013.01); *G03B 11/00* (2013.01); *G03B 13/34* (2013.01); *H04N 5/2254* (2013.01); *G02B 5/205* (2013.01); *G03B 9/12* (2013.01); *H04N 5/2252* (2013.01)

(56) References Cited

U.S. PATENT DOCUMENTS

| | | | | |
|---|---|---|---|---|
| 2005/0275740 | A1* | 12/2005 | Nagano | G02B 7/08 348/335 |
| 2006/0093351 | A1* | 5/2006 | Lee | H04N 5/2254 396/505 |
| 2006/0222356 | A1* | 10/2006 | Hosota | G03B 9/10 396/89 |
| 2006/0250702 | A1* | 11/2006 | Nishimoto | G02B 7/10 359/704 |
| 2009/0295983 | A1* | 12/2009 | Sekimoto | H04N 5/2254 348/362 |

FOREIGN PATENT DOCUMENTS

| | | |
|---|---|---|
| JP | 2005-062315 A | 3/2005 |
| JP | 2007-271670 A | 10/2007 |
| JP | 2011-102823 A | 5/2011 |
| JP | 2012-002837 A | 1/2012 |
| JP | 2012-255972 A | 12/2012 |
| WO | 2005/036251 A1 | 4/2005 |

\* cited by examiner

LENS UNIT, CAMERA, AND ELECTRONIC DEVICE

CROSS-REFERENCE TO RELATED APPLICATIONS

This is a U.S. national phase application under 35 U.S.C. § 371 of International Patent Application No. PCT/JP2016/073447, filed Aug. 9, 2016, and claims benefit of priority to Japanese Patent Application No. 2015-162985, filed Aug. 20, 2015. The entire contents of these applications are hereby incorporated by reference.

FIELD OF TECHNOLOGY

The present invention relates to a lens unit, a camera, and an electronic device.

BACKGROUND

Among electronic devices such as smartphones, and the like, there are those that are equipped with cameras. Japanese Unexamined Patent Application Publication 2004-309954 discloses a camera (an imaging device) that is installed in a smartphone. This imaging device is structured from an imaging element and a lens (an optical member), where a shutter, for blocking the light that passes through the lens, is provided on the imaging subject side of the lens.

Cameras that are equipped in smartphones (not limited to the camera of Japanese Unexamined Patent Application Publication 2004-309954) are designed so that the length in the optical axial direction is shorter than the thickness of the smartphone, so as to be contained within the thickness of the smartphone. Moreover, because there are requirements such as being carried easily, there is the need for smartphones to be made thinner. Because of this, there is the need for cameras that are shorter in the optical axial direction. Moreover, there is also the need to improve the quality of the captured image. Because of this, there is also the need for cameras to be provided with iris blades, and the like, for adjusting the brightness and depth of field of the light that passes through the lens.

SUMMARY

One may consider replacing the shutter blade of the camera in Japanese Unexamined Patent Application Publication 2004-309954 with an iris blade, to provide an iris blade in the camera. However, when an iris blade is added to a camera, the iris blade must be provided between the lenses. Because of this, there is a problem in that it is difficult to replace, with an iris blade, the shutter blade of the camera in Japanese Unexamined Patent Application Publication 2004-309954, wherein the shutter blade is disposed in front of the lens.

Moreover, in order to produce a camera that is equipped with a blade, such as an iris blade, and that is short in the optical axial direction, it is necessary for the lens unit that structures the camera to be able to extend and retract the blade between the lenses, and to be short in the optical axial direction.

The present invention was created in contemplation of such a situation, and the object thereof is to provide a lens unit, a camera, and an electronic device comprising a blade that extends and retracts between lenses, and that is short in the optical axial direction.

In order to achieve the object set forth above, a lens unit according to a first aspect according to the present invention comprises:

a lens barrel for holding a plurality of lenses, having a first slit that extends in a circumferential direction;

a pair of base plates that each has an opening portion, which are stacked to form a blade chamber therebetween, with a portion thereof protruding from the first slit, and which are positioned so that the opening portions thereof are between the lenses;

a blade that is disposed in the blade chamber; and a blade driving portion, secured to the portion of the pair of base plates, for driving the blade to open and close the opening portion in the blade.

This enables the provision of a lens unit having, between lenses, a pair of base plates that structure a blade chamber wherein a blade is disposed, and which can be equipped with a blade that extends and retract between lenses. As a result, the base plates are provided despite the spacing between lenses being narrow, thus enabling a design wherein the spacing between lenses, wherein the base plates are disposed, can be narrow. The result is the ability to produce a lens unit that is short in the optical axial direction.

Moreover, a lens barrel driving portion for moving the lens barrel in the optical axial direction of the plurality of lenses may also be provided.

This enables the provision of an automatic focusing function through the provision of a lens barrel driving portion that moves the lens barrel in the optical axial direction.

Moreover, an outer frame for holding the lens barrel so as to enable sliding in the optical axial direction may also be provided, wherein:

an electrode may be provided on the outer frame and a coil of an electromagnetic actuator that is provided in the blade driving portion are connected electrically through a leaf spring.

This enables the load to be reduced when moving the lens barrel in the optical axial direction. Because of this, the lens barrel is moved smoothly and rapidly to the focal point. Moreover, the ability to reduce the forces that act on the parts that are connected electrically, which can prevent tilt of the optical axis.

Moreover the lens barrel may comprise a second slit that is opposite from the first slit, with the optical axis therebetween, wherein:

the pair of base plates may be inserted through the first slit and the second slit.

This reduces the likelihood that the pair of base plates will shift from the prescribed position. Moreover, this can prevent the pair of base plates from contacting the lens.

Moreover, the blade driving portion may be structured from a driving portion base whereon an electromagnetic actuator is provided, and a driving portion cover for covering the electromagnetic actuator; and the driving portion base and the driving portion cover may hold a portion of one or both of the pair of base plates therebetween.

Through this, the pair of base plates is secured stably to the blade driving portion. Moreover, this enables the pair of base plates and the blade driving portion to be assembled easily.

Moreover the blade may be structured from an iris blade, a light blocking blade, or a blade that has an optical filter.

This enables the lens unit to be provided with an iris function, a shutter function, or a filtering function such as an optical ND (Neutral Density) filter.

In order to achieve the object set forth above, a camera according to a second aspect according to the present invention comprises:

the lens unit; and an imaging portion wherein a photographic subject image is focused onto an imaging surface by the lenses that are provided in the lens barrel.

In order to achieve the object set forth above, an electronic device according to a third aspect according to the present invention comprises said camera.

The present invention enables the provision of a lens unit, a camera, and an electronic device that is equipped with a blade that extends and retracts between lenses, and that is shorter in the optical axial direction.

BRIEF DESCRIPTIONS OF THE DRAWINGS

DETAILED DESCRIPTION

A lens unit according to an example the present invention will be explained in detail below while referencing drawings that use, as an example, a lens unit used in a camera.

Figure 1A:
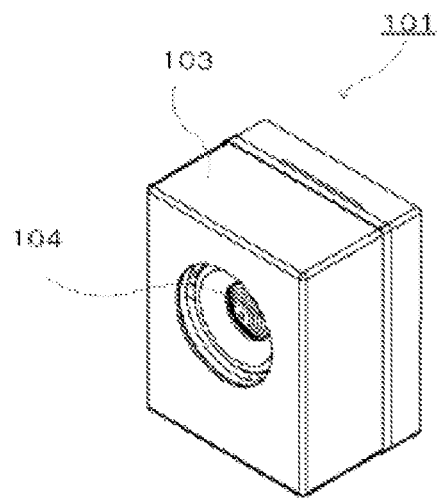
FIG. 1A is a diagram illustrating a structure of a camera according to an example.
Figure 1B:
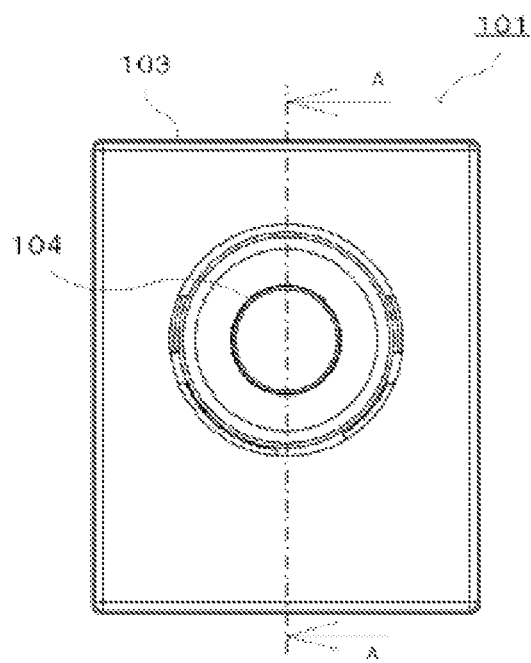
FIG. 1B is a front view illustrating a structure of a camera according to an example.
Figure 2:
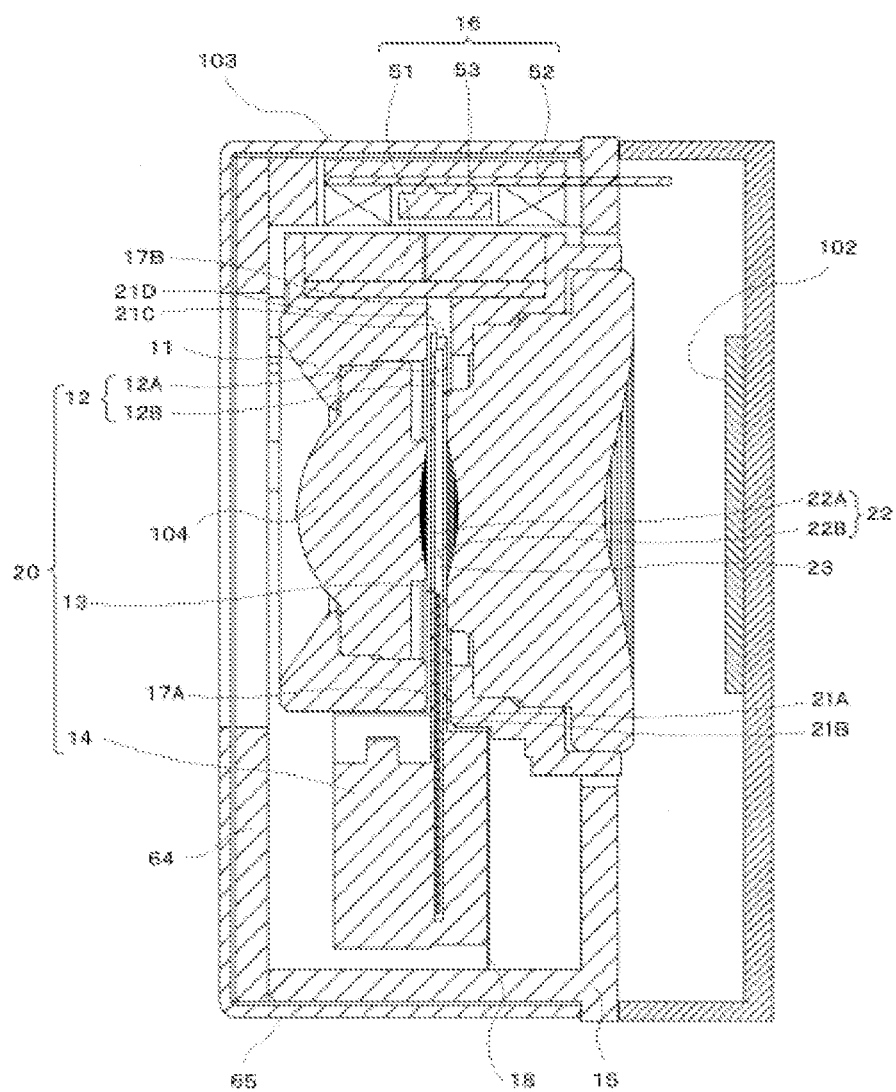
FIG. 2 is a cross-sectional diagram along the section A-A in FIG. 1B.

A camera 101, according to an example according to the present invention, as illustrated in FIG. 1A, FIG. 1B, and FIG. 2, comprises an imaging portion 102 (shown only in FIG. 2), and a lens unit 103. The camera 101 can be built into an electronic device such as a smartphone, or the like.

The imaging portion 102 converts, into electrical signals, an image of a photographic subject that is focused onto an imaging surface by a lens 104. The imaging portion 102 is structured from a CCD (Charge Coupled Device) imaging sensor or a CMOS (Complementary Metal Oxide Semiconductor) imaging sensor, or the like.

Figure 3:
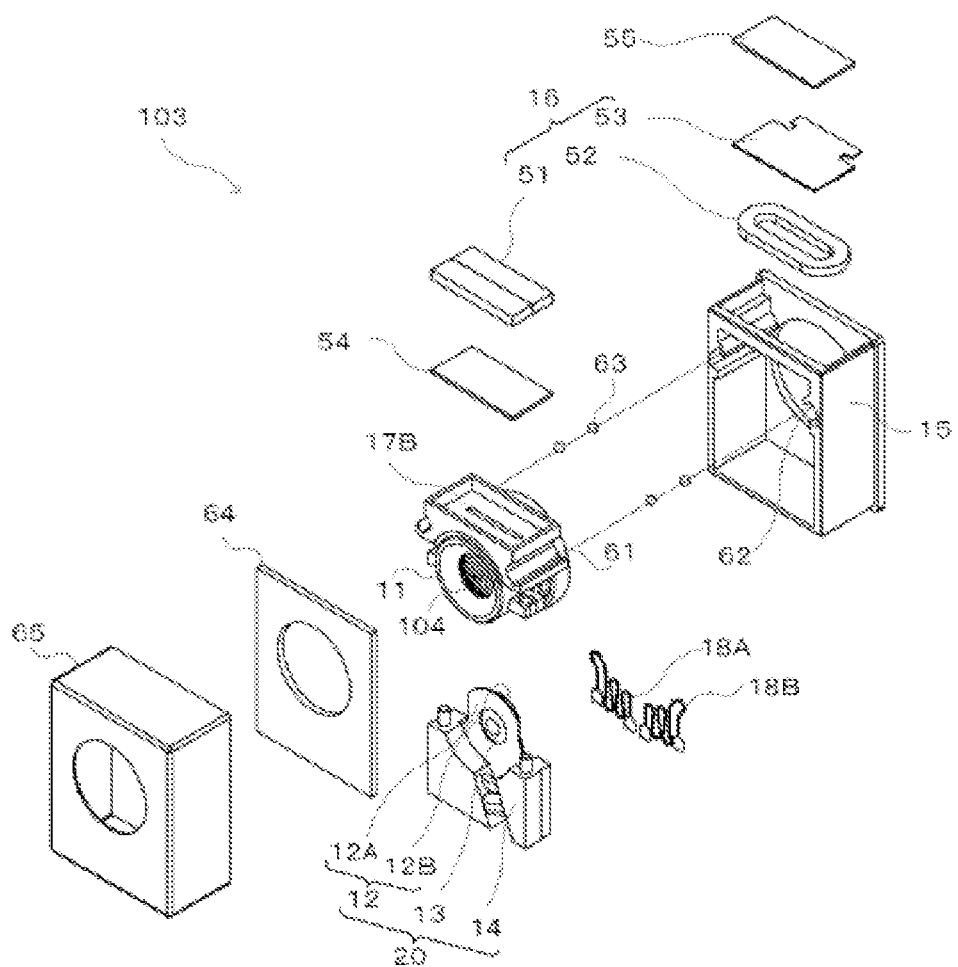
FIG. 3 is an assembly diagram illustrating a lens unit according to an example.
Figure 4A:
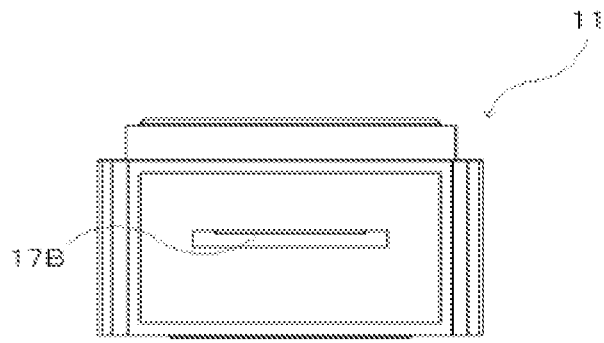
FIG. 4A is a top view of a lens barrel in an example.
Figure 4B:
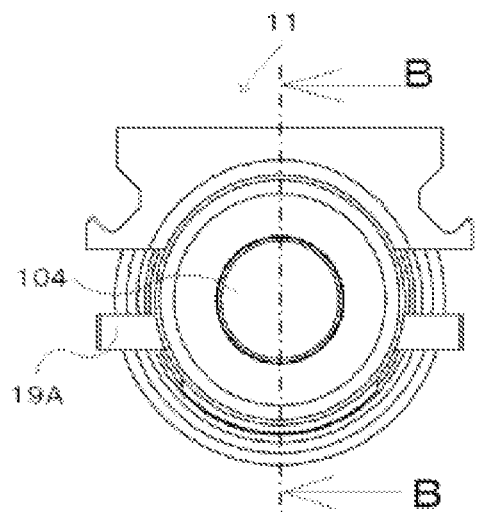
FIG. 4B is a front view of a lens barrel in an example.
Figure 4C:
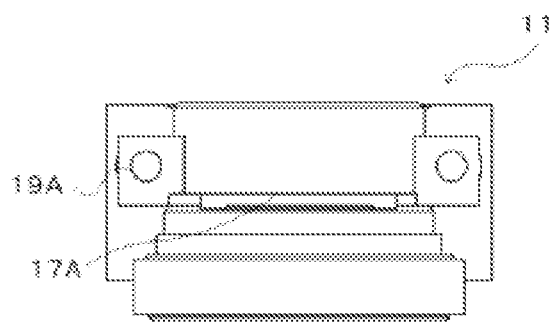
FIG. 4C is a bottom view of a lens barrel in an example.
Figure 4D:
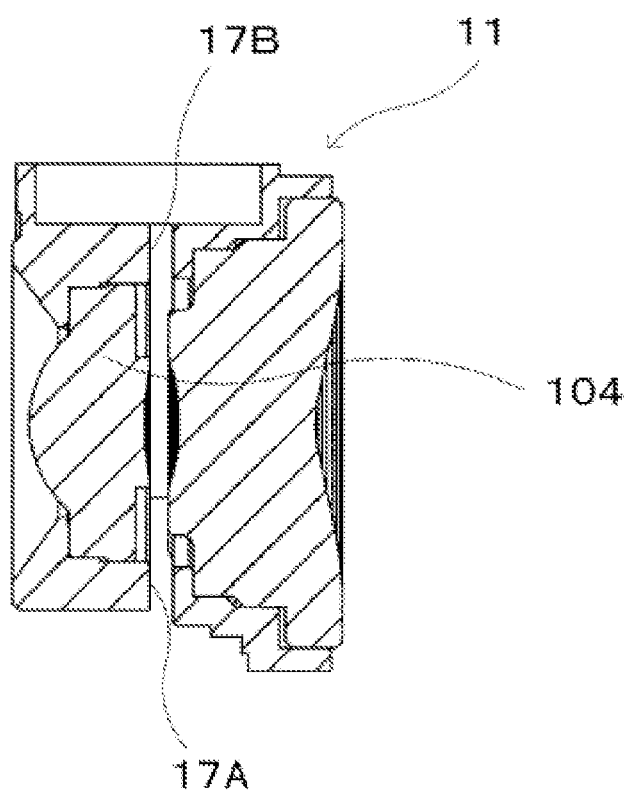
FIG. 4D is a cross-sectional diagram along the section B-B in FIG. 4B.

The lens unit 103, as illustrated in FIG. 2 and FIG. 3, comprises: a lens barrel 11 for holding lenses 104; base plates 12 (12A and 12B); an iris blade 13; a blade driving portion 14, an outer frame 15; a lens barrel driving portion 16; and leaf springs 18 (18A and 18B). Note that the base plates 12, the iris blade 13, and the blade driving portion 14 structure an iris unit 20.

The lens barrel 11, as illustrated in FIG. 2, is a lens barrel for holding a plurality of lenses 104. As illustrated in FIG. 4A through FIG. 4D, the lens barrel 11 has a first slit 17A that extends in the circumferential direction, and a second slit 17B, which is opposite from the first slit 17A, with the optical axis therebetween, and a connecting portion 19A. The first slit 17A is for insertion of the base plate 12 from the interior of the lens barrel 11 to the exterior of the lens barrel 11. The ends 21C and 21D of the base plates 12 are inserted into the second slit 17B. The connecting portion 19A is for connecting to the blade driving portion 14 to the lens barrel 11.

Figure 5:
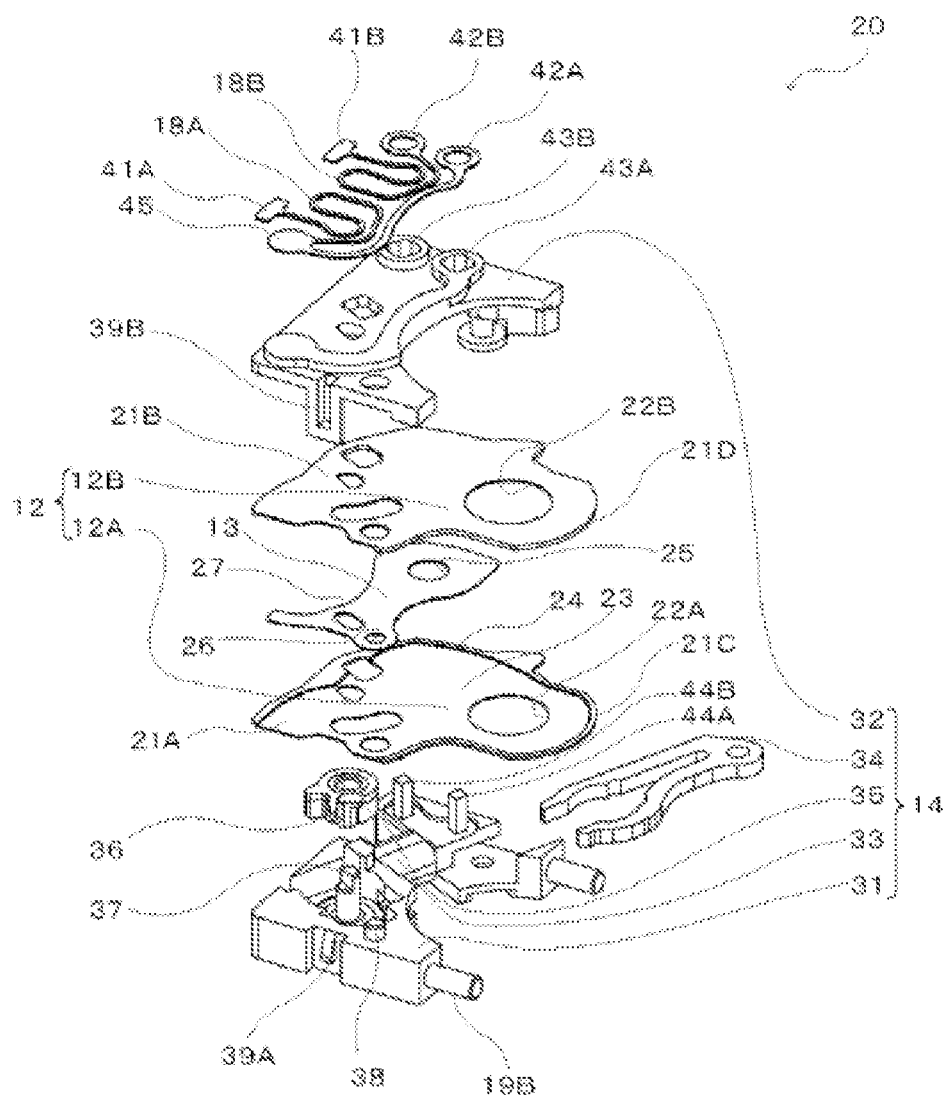
FIG. 5 is an assembly diagram illustrating a blade driving portion, a base plate, and an iris blade according to an example.

The base plates 12 (12A and 12B), as illustrated in FIG. 5, are structured from opaque resin members, and are provided with circular opening portions 22 (22A and 22B). The base plate 12A and 12B are stacked so that the opening portions 22A and 22B overlap. In this case, a blade chamber 23 is formed between the base plates 12A and 12B. Moreover, there are spacers 24 at the edges of the base plates 12 (12A and 12B) so as to form the space in the blade chamber 23. Returning to FIG. 2, the base plates 12 are disposed in the lens barrel 11 so that the opening portions 22 (22A and 22B) will be positioned between the lenses 104. Portions 21A and 21B of the base plates 12 (12A and 12B) both protrude to the outside of the lens barrel 11 from the first slit 17A. Moreover, the ends 21C and 21D of the base plate 12 are each inserted into the second slit 17B.

The iris blade 13, as illustrated in FIG. 5, is a blade that is disposed in the blade chamber 23, and is caused to undergo reciprocating motion to extend into and retract from the opening portions 22. Moreover, the iris blade 13 comprises: an iris opening portion 25, a hole 26 that is provided at a blade base portion, and a hole 27 that is provided in the vicinity of the hole 26. A supporting point pin 38 that is installed vertically in a driving portion base 31, described below, is inserted into the hole 26. Through this, the iris blade 13 uses the supporting point pin 38 as a supporting point, to be held axially so as to enable reciprocating motion. A driving pin 36, described below, is inserted into the hole 27.

Figure 6:
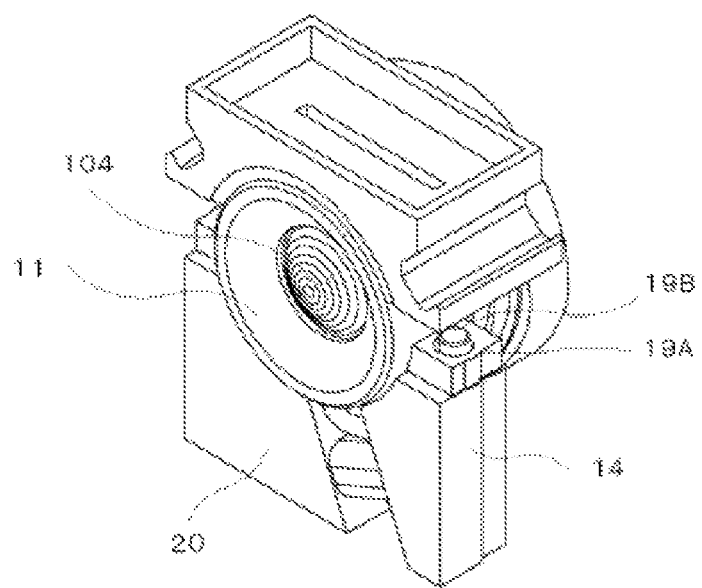
FIG. 6 is a diagram illustrating a lens barrel and a blade driving portion according an example.

The blade driving portion 14 is secured to portions 21A and 21B of the base plates 12 (12A and 12B), and the iris blade 13 is driven to open and close the opening portions 22 by the iris blade 13, and is equipped with a driving portion base 31, the driving portion cover 32, a coil 33, a yoke 34, and a rotor 35. Note that the coil 33, the yoke 34, and the rotor 35 structure an electromagnetic actuator. The coil 33, the yoke 34, the rotor 35, and the like, are disposed at prescribed positions on the driving portion base 31. The driving portion base 31 is provided with a bobbin portion that is provided with a through hole. A coil 33 is wrapped onto this bottom portion. The yoke 34 has two leg portions. The tip ends of the leg portions structure magnetic pole portions. One of the leg portions of the yoke 34 is inserted into the through hole that is provided in the bobbin portion. The rotor 35 has a round cylindrical shape, and is structured from a magnet that is magnetized into two poles in the radial direction. Moreover, the rotor 35 is disposed in a position that is held between the positions of the legs of the yoke 34, and is born axially on the rotating pin 37 that is installed vertically in the driving portion base 31. Through this, the rotor 35 is rotated by the magnetic field that is produced by the yoke 34. The driving pin 36 is attached to the tip of the arm that is provided in the rotor 35, and is inserted into the hole 27 of the iris blade 13, described above. Through this, the driving pin 36 transmits, to the iris blade 13, the rotational motion of the rotor 35. Moreover, the supporting point pin 38 that is inserted into the hole 26 of the iris blade 13, described above, is installed vertically in the driving portion base 31. Moreover, a connecting portion 19B, for connecting to the lens barrel 11, is provided in the driving portion base 31. Moreover, the driving portion base 31 and the driving portion cover 32 hold portions 21A and 21B of the base plates 12A and 12B therebetween. Note that the assembly of the iris unit 20 is carried out as described below. First a base plate 12A is positioned over the driving portion base 31 on which the coil 33, the yoke 34, and the rotor 35 are arranged. Above this, the iris blade 13 is positioned so that the driving pin 36 is inserted into the hole 27 and the supporting point pin 38 is inserted into the hole 26. The base plate 12B is positioned thereover. The iris unit 20 is assembled when the protruding portion 39A is secured through fitting into the hole 39B so that the driving portion cover 32 holds portions 21A and 21B of the base plates 12A and 12B therebelow. The base plate 12 of the iris unit 20 that has been assembled is inserted from the first slit 17A, illustrated in FIG. 4C, and the connecting portion 19B is connected to the connecting portion 19A, as illustrated in FIG. 6, to secure the iris unit 20 to the lens barrel 11.

Returning to FIG. 3, the outer frame 15 is a member that holds the lens barrel 11 so as to enable a plurality of lenses 104 to slide in the optical axial direction. The outer frame 15 has a box-shape, and is provided on the back face thereof (the face on the side of the imaging portion 102), with a circular hole for guiding light, and, in a front view, is open. Moreover, the top face is a part wherein the lens barrel driving portion 16 is disposed, and is open. Moreover, a sliding portion 61 is provided on the lens barrel 11 and a sliding portion 62 is provided on the outer frame 15 so that the lens barrel 11 is able to slide in the optical axial direction. Bearings 63 are disposed between the sliding portion 61 and the sliding portion 62. Moreover, a cover 64 and a case 65 are provided so as to cover the open faces on the outside of the outer frame 15.

The lens barrel driving portion 16 is that which moves the lens barrel 11 in the optical axial direction relative to the outer frame 15. The lens barrel driving portion 16 is structured from a magnet 51, a driving coil 52, and a Hall sensor 53. The magnet 51 is secured to the lens barrel 11. A magnetic shield member 54, which is a member for preventing leakage of the magnetic field, is provided between the magnet 51 and the lens barrel 11. The driving coil 52 is that which produces the magnetic field for moving the magnet 51, and is secured to the outer frame 15. A magnetic field is produced when an electric current is applied to the driving coil 52. The magnet 51 moves when the magnetic field is produced, and the lens barrel 11 moves accordingly in the optical axial direction. The Hall sensor 53 is a sensor for detecting the distance of movement of the lens barrel 11, and is disposed on the driving coil 52. The magnetic shielding member 55 is a member for preventing leakage of the magnetic field, and it is disposed over the Hall sensor 53.

The leaf springs 18A and 18B are conductor portions for supplying power to the coil 33 of the blade driving portion 14 from an electrode that is provided on the outer frame 15, and have serpentine shapes. The leaf springs 18A and 18B, as illustrated in FIG. 5 are disposed on the driving portion cover 32. Electrodes 41A and 41B are parts for connecting to electrodes that are provided on the outer frame 15. Moreover, the leaf spring 18A is secured to the driving portion cover 32 by an electrode 42A and a part of the securing portion 45, and deforms flexibly between the electrode 41A and the securing portion 45. Moreover, the leaf spring 18B is secured to the driving portion cover 32 by a part of an electrode 42B, and deforms flexibly between the electrode 41B and the electrode 42B. Moreover, the electrodes 42A and 42B are connected electrically to conductive lead portions 44A and 44B that are inserted into holes 43A and 43B. Note that the lead portions 44A and 44B are connected electrically to lead wires that extend out from the coil 33.

Figure 7:
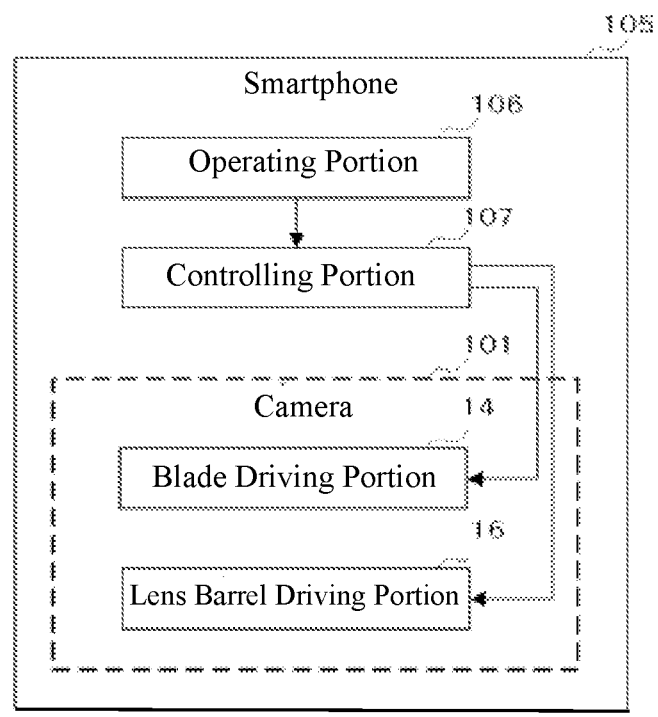
FIG. 7 is a block diagram of a smart phone that comprises a camera according to an example.

The operation of the camera 101 according to an example according to the present invention will be explained next for a case wherein the camera 101 is provided in a smartphone 105, as illustrated in FIG. 7. Note that the smartphone 105 is provided with an operating portion 106 and a controlling portion 107, in addition to the camera 101.

When the operating portion 106 receives an operation for selecting an imaging mode, the camera 101 goes into an imaging standby state. The camera 101 captures a live-view image of a photographic subject image that passes through the lens 104 to be focused onto an imaging portion 102, and the smartphone 105 displays this live-view image on a display.

The controlling portion 107 moves the lens barrel 11 in the optical axial direction and performs focusing by supplying an electric current to the driving coil 33, 52 of the lens barrel driving portion 16 based on the live-view image that has been captured. Specifically, based on the principle that the correct focus is where the contrast is maximized, while moving the lens barrel 11, the camera 101 performs focusing by analyzing the live-view image through a contrast detecting method to find the position of the lens barrel 11 wherein the contrast of the live-view image is maximized.

Figure 8:
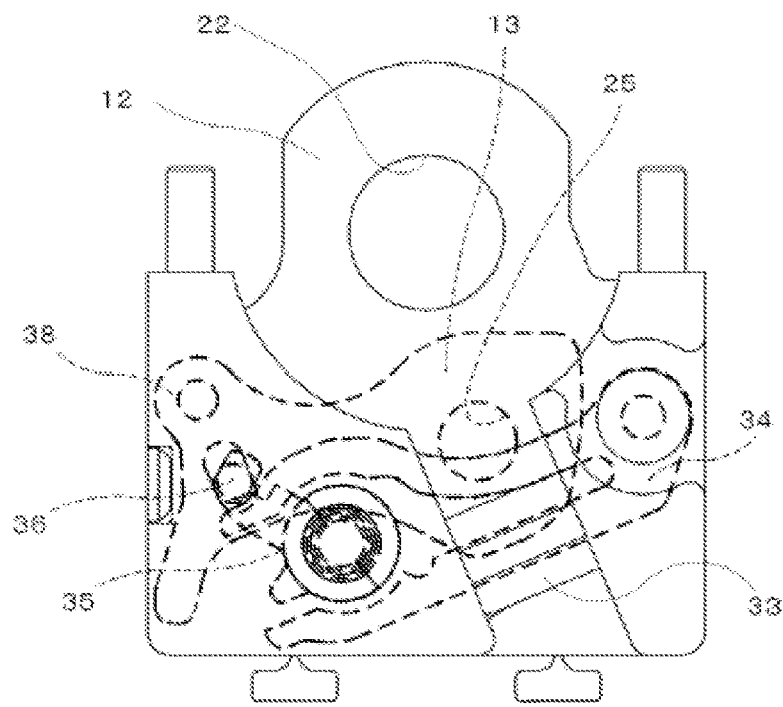
FIG. 8 is a diagram illustrating the operation of an iris blade according an example.
Figure 9:
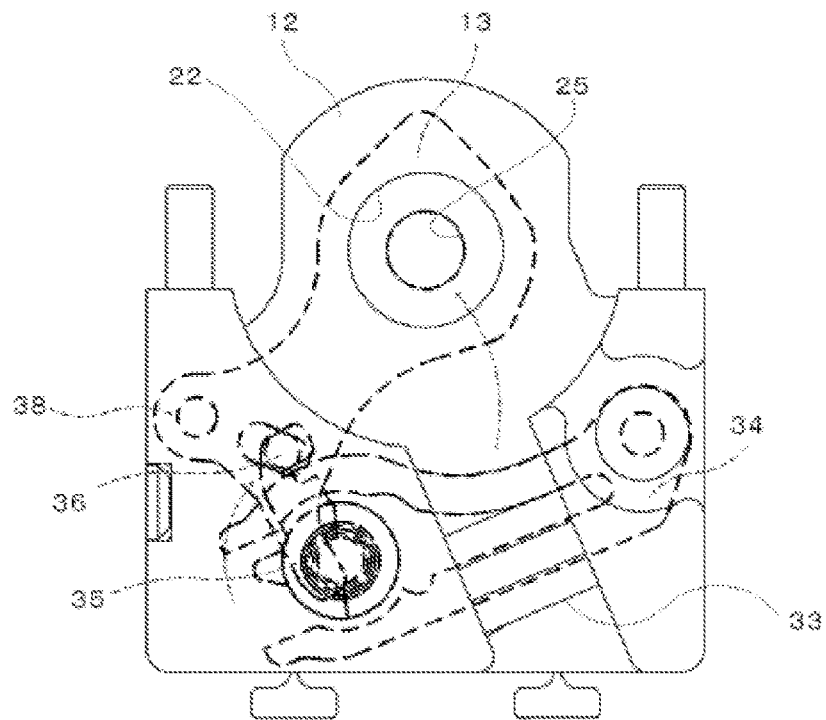
FIG. 9 is a diagram illustrating the operation of an iris blade according an example.

Moreover, the controlling portion 107 opens or closes the opening portion 22 in the iris blade 13 based on whether or not the brightness of the live-view image is at least a brightness that has been set in advance, or in response to an operation received by the operating portion 106. In the default state, the iris blade 13 is retracted, as illustrated in FIG. 8. To produce a state wherein the iris is narrowed, the controlling portion 107 applies an electric current to the coil 33 in the forward direction. When the electric current is applied to the coil 33 in the forward direction, the rotor 35 rotates in the clockwise direction, as illustrated in FIG. 9. When the rotor 35 rotates in the clockwise direction, the iris blade 13 is rotated by the driving pin 36 in the counterclockwise direction, moving the iris opening portion 25 to the position of the opening portion 22. In contrast, when the iris is to be put into a retracted state from the narrowed state, the controlling portion 107 supplies an electric current in the opposite direction to the coil 33. When an electric current in the opposite direction is supplied to the coil 33, the rotor 35 rotates in the counterclockwise direction. When the rotor 35 rotates in the counterclockwise direction, the iris blade 13 is rotated in the clockwise direction by the driving pin 36, to return to the retracted position, illustrated in FIG. 8.

Moreover, in a state wherein the live-view image is displayed, the controlling portion 107 adjusts the focus and operates the iris blade 13. When, in this state, the operating portion 106 receives an operation wherein the release button is pressed, the controlling portion 107 sends a reset signal to the imaging element. When the reset signal is sent, the imaging is started by discharging the accumulated electric charge and commencing again accumulation of electric charge by the imaging element. Thereafter, when a prescribed exposure time has elapsed, the electric charges that have accumulated in the imaging element are transferred, as image information, to a storing device of the smartphone 105. The imaging standby state is restarted thereafter, to capture live-view images, where the controlling portion 107 displays these live-view images on the display of the smartphone 105.

As described above, with the camera 101 according to the present example, base plates 12 (12A and 12B) are disposed between lenses 104, and the iris blade 13 is provided in a blade chamber 23 between the base plates 12 (12A and 12B). This structure enables the provision of an extendable/retractable blade between the lenses 104. Moreover, the spacing between the lenses 104 being equal to the thickness of the base plates 12 (12A and 12B) and the blade chamber 23, enables the base plates 12 (12A and 12B) to be disposed between the lenses 104. This makes it possible to shorten the length of the camera 101 in the optical axial direction. Moreover, the lens barrel 11 is provided on the outer frame 15 so as to be able to slide in the optical axial direction, and a lens barrel driving portion 16 able to move the lens barrel 11 in the optical axial direction is provided. This structure enables the camera 101 to be equipped with an automatic focusing function. Moreover, the electrodes of the outer frame 15 and the coil 33 of the blade driving portion 14 are connected electrically by the leaf springs 18. This enables electric power to be supplied from the electrodes of the outer frame 15 to the coil 33 of the blade driving portion 14, enabling a reduction in the load when the lens barrel 11 slides in the optical axial direction. The result is that the lens barrel 11 slides smoothly, enabling rapid focusing. Moreover, because the leaf spring 18 is able to deform flexibly, this can prevent the optical axis of the lens barrel 11 from becoming tilted. The result is the ability to prevent degradation of the image quality due to tilting of the optical axis of the lenses 104.

Modified Example

Figure 10A:
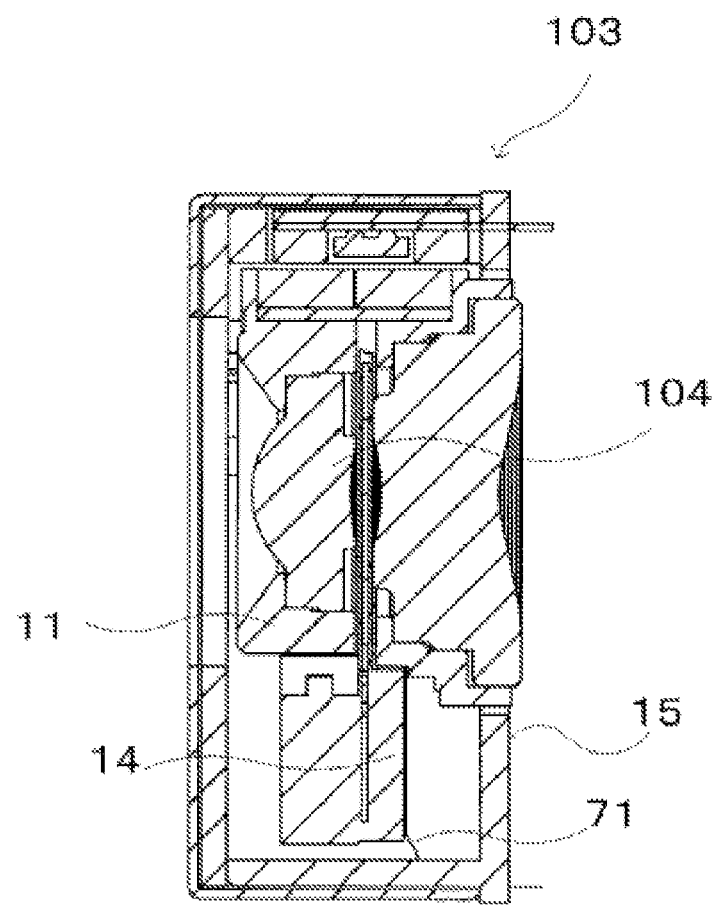
FIG. 10A is a diagram illustrating a modified example of a lens barrel, an outer frame, and an electrical linkage according an example.
Figure 10B:
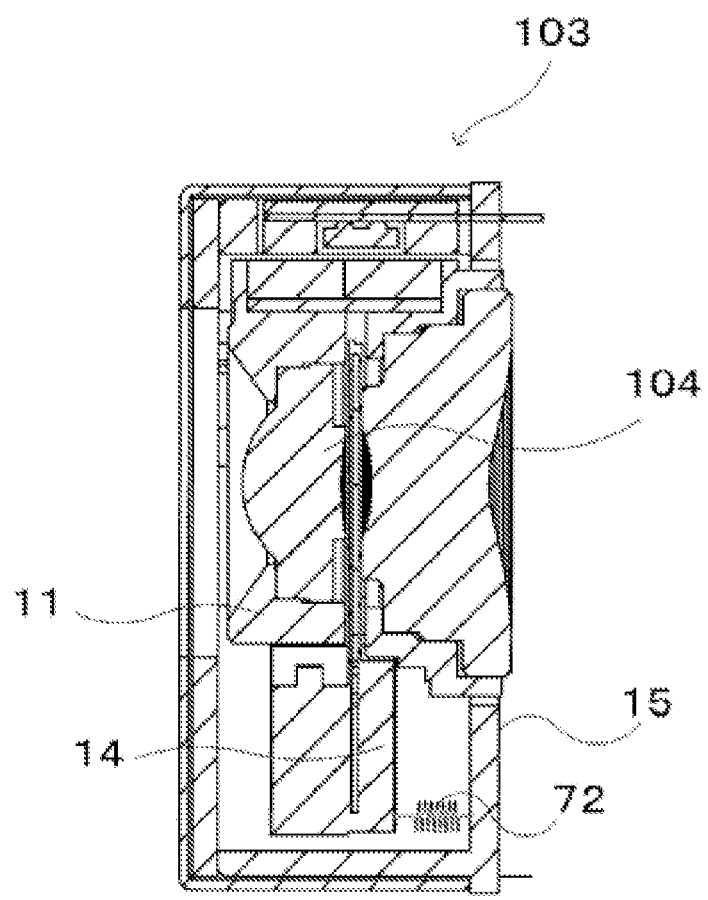
FIG. 10B is a diagram illustrating a modified example of a lens barrel, an outer frame, and an electrical linkage according an example.
Figure 10C:
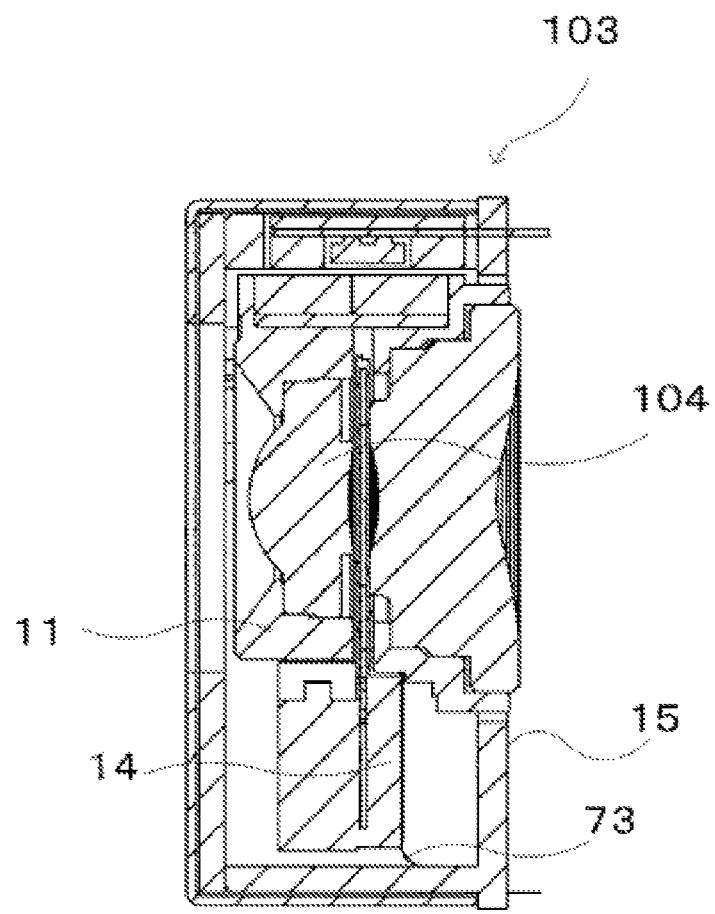
FIG. 10C is a diagram illustrating a modified example of a lens barrel, an outer frame, and an electrical linkage according an example.

A case wherein the lens barrel 11 and the outer frame 15 were connected electrically through leaf springs 18 was described in the camera 101 of the example described above. In the camera 101 according to the present example, there is no particular limitation on the members for connecting the lens barrel 11 and the outer frame 15 electrically, insofar as they are able to achieve an electrical connection. For example, they may instead be the suspension wires 71 that are straight (wire-shaped) metal springs, as shown in FIG. 10A. In this case, the members for connecting electrically can be disposed in a narrow space. Moreover, as illustrated in FIG. 10B, they may be coil springs 72 wherein wires are wound helically into circular column shapes instead. In this case, the spring constant can be made smaller. Moreover, they may be FPC's (flexible printed circuit) 73, such as FFC's (flexible flat cables), wherein flat plate-shaped conductors are coated with insulators, as illustrated in FIG. 10C. In this case, the degree of insulation can be increased when compared to a case wherein a spring is used.

While, with the camera 101 of the example described above, the explanation was for a case wherein portions 21A and 21B of base plates 12A and 12B were both held between the driving portion base 31 and the driving portion cover 32, a portion 21A of the base plate 12A or a portion 21B of the base plate 12B, but not both, may instead be held between the driving portion base 31 and the driving portion cover 32. This enables a design wherein the lens barrel driving portion 16 is made smaller when compared to the case wherein both base plates 12A and 12B are held therebetween, as described above.

While, with the camera 101 of the example set forth above, the explanation was for an example wherein an iris blade 13 that has an iris opening portion 25 is provided was explained, the camera 101 may instead be provided with a light-blocking blade (a shutter blade) that blocks the transmission of light. In this case, in the imaging standby state, the controlling portion 107 of the smartphone 105 retracts the shutter blade to capture the live-view image of the photographic subject image to display the light of-view image on the display of the smartphone 105. When the release button is pressed, a reset signal is sent to the imaging element, and the imaging is started by discharging the accumulated electric charge and commencing again accumulation of electric charge by the imaging element. Thereafter, when a prescribed exposure time has elapsed, the shutter blade is closed, and the electric charges that have accumulated in the imaging element are transferred, as image information, to a storing device of the smartphone 105. Thereafter, the controlling portion 107 retracts the shutter blade to return to the imaging standby state. Providing the camera 101 with a shutter blade can reduce the noise in the image because the electric charge that is accumulated in the imaging element is transferred to the storing device in a state wherein the shutter blade is closed.

Moreover, the iris blade 13 may be replaced with, for example, an optical filter such as an ND filter, an IR (infrared)-transparent filter, an IR-cutting filter, or the like. When an ND filter is used, this can reduce the brightness if the imaging subject is to bright. The use of an IR-transparent filter enables capturing of an infrared radiation photograph. The use of an IR-cut filter enables capturing of a photograph from which infrared radiation has been removed.

In the example described above, the explanation was for a case wherein the camera 101 is provided in a smartphone; however, the camera 101 may be provided in an electronic device other than a smartphone (such as, for example, a mobile terminal such as a tablet PC, or the like, a personal computer such as a notebook PC or a desktop PC, a wearable terminal such as a wristwatch-type terminal, a mobile game device, or the like).

Moreover, while, in the examples set forth above, the explanation was for a case wherein the camera 101 was equipped with a single iris blade 13, the camera 101 may instead be equipped with two or more blades 13, or a shutter blade, and an optical filter may be provided in addition to the iris blade 13. Doing so enables a further improvement in the quality of the image that is captured by the camera 101.

Moreover, while in the example set forth above the lens barrel driving portion 16 was disposed so that, when viewed from the optical axial direction, the angle formed by the perpendicular line from the blade driving portion 14 to the optical axis the perpendicular line from the lens barrel driving portion 16 to the optical axis is 180°, the interior angle formed by the perpendicular line from the blade driving portion 14 to the optical axis the perpendicular line from the lens barrel driving portion 16 to the optical axis may be between 90° and 180° instead. Doing this enables a design that conforms to the outer shape of the lens unit 103.

The present invention can have a variety of examples or modifications that do not deviate from the scope of the spirit of the broad definition of the present invention. Moreover, the examples set forth above are to explain this invention, and do not limit the scope of the present invention. That is, the scope of the present invention is defined by the patent claims, not by the examples. Given this, various modifications that are within the patent claims, or within the scope of the broad meaning of the inventions that are equivalent thereto, are viewed as being within the scope of the invention.

The present application is based on Japanese Patent Application 2015-162985, filed on Aug. 20, 2015. The Specification, Claims, and Drawings of Japanese Patent Application 2015-162985 in are incorporated in their entirety, by reference, in this Specification.

The present invention can be used suitably as a lens unit provided in a camera of an electronic device (such as, for example, a mobile terminal such as a smartphone, a tablet PC, or the like, or a personal computer, such as a notebook personal computer, a desktop personal computer, or the like), or as a camera in such an electronic device, or as such an electronic device.

The invention claimed is:

1. A lens unit comprising:
a lens barrel for holding a plurality of lenses, having a first slit that extends in a circumferential direction;
a pair of base plates that each has an opening portion, which are stacked to form a blade chamber therebetween, with a portion thereof protruding from the first slit, and which are positioned so that the opening portions thereof are between the lenses;
a blade that is disposed in the blade chamber; and
a blade driving portion, secured to the portion of the pair of base plates, for driving the blade to open and close the opening portion in the blade, wherein the blade driving portion is structured from a driving portion base whereon an electromagnetic actuator is provided, and a driving portion cover for covering the electromagnetic actuator, and wherein the driving portion base and the driving portion cover hold a portion of one or both of the pair of base plates therebetween.

2. The lens unit as set forth in claim 1, comprising:
a lens barrel driving portion moving the lens barrel in the optical axial direction of the plurality of lenses.

3. The lens unit as set forth in claim 2, comprising:
an outer frame holding the lens barrel so as to enable sliding in the optical axial direction, wherein:
an electrode provided on the outer frame and a coil of an electromagnetic actuator that is provided in the blade driving portion are connected electrically through a leaf spring.

4. The lens unit as set forth in claim 1, wherein:
the lens barrel comprises a second slit that is opposite from the first slit, with the optical axis therebetween, wherein:
the pair of base plates is inserted through the first slit and the second slit.

5. The lens unit as set forth in claim 1, wherein:
the blade is structured from an iris blade, a light blocking blade, or a blade that has an optical filter.

6. The camera comprising:
a lens unit as set forth in claim 1; and
an imaging portion wherein a photographic subject image is focused onto an imaging surface by the lenses that are provided in the lens barrel.

7. The electronic device comprising a camera as set forth in claim 6.

8. A lens unit comprising:
a lens barrel holding a plurality of lenses, having a first slit that extends in a circumferential direction;
a pair of base plates that each has an opening portion, which are stacked to form a blade chamber therebetween, with a portion thereof protruding from the first slit, and which are positioned so that the opening portions thereof are between the lenses;
a blade disposed in the blade chamber;
a blade driving portion, secured to the portion of the pair of base plates, driving the blade to open and close the opening portion in the blade;
a lens barrel driving portion moving the lens barrel in the optical axial direction of the plurality of lenses; and
an outer frame holding the lens barrel so as to enable sliding in the optical axial direction, wherein an electrode provided on the outer frame and a coil of an electromagnetic actuator that is provided in the blade driving portion are connected electrically through a leaf spring.

9. The lens unit as set forth in claim 8, wherein:
the lens barrel comprises a second slit that is opposite from the first slit, with the optical axis therebetween, wherein the pair of base plates is inserted through the first slit and the second slit.

10. The lens unit as set forth in claim 8, wherein:
the blade driving portion is structured from a driving portion base whereon an electromagnetic actuator is provided, and a driving portion cover covering the electromagnetic actuator; and
the driving portion base and the driving portion cover hold a portion of one or both of the pair of base plates therebetween.

11. The lens unit as set forth in claim 8, wherein:
the blade is structured from an iris blade, a light blocking blade, or a blade that has an optical filter.

12. The camera comprising:
a lens unit as set forth in claim 8; and
an imaging portion wherein a photographic subject image is focused onto an imaging surface by the lenses provided in the lens barrel.

13. The electronic device comprising a camera as set forth in claim 12.

* * * * *